United States Patent

[11] 3,602,797

| [72] | Inventor | Johannes Hartmut Bleher<br>Fishkill, N.Y. |
|---|---|---|
| [21] | Appl. No. | 820,745 |
| [22] | Filed | May 1, 1969 |
| [45] | Patented | Aug. 31, 1971 |
| [73] | Assignee | Robert Bosch GmbH<br>Stuttgart, Germany |
| [32] | Priority | May 10, 1968 |
| [33] | | Germany |
| [31] | | P 17 63 350.0 |

[54] VOLTAGE REGULATOR, PARTICULARLY FOR CONSTRUCTION AS AN INTEGRATED CIRCUIT
6 Claims, 4 Drawing Figs.

[52] U.S. Cl. .................................................. 322/28, 322/58, 322/73, 323/22 T
[51] Int. Cl. ............................................................ H02p 9/30
[50] Field of Search ............................................ 322/22, 23, 28, 32, 73, 58; 323/22 T, 22 SC

[56] References Cited
UNITED STATES PATENTS

| 3,179,874 | 4/1965 | Guennou | 322/28 X |
| 3,209,236 | 9/1965 | Bridgeman | 322/73 X |
| 3,443,200 | 5/1969 | Kuhn | 322/28 X |

*Primary Examiner*—Oris L. Rader
*Assistant Examiner*—H. Huberfeld
*Attorney*—Flynn & Frishauf ABSTRACT: An automotive type voltage regulator includes a differential amplifier having push-pull inputs applied thereto; the voltage divider is formed as a bridge circuit which includes voltage-sensitive elements, unbalance at the bridge triggering the differential amplifier to supply an output potential to a preamplifier with low frequency amplification characteristics to control a switching transistor in series with the field of an automotive generator. The low frequency transistor, formed of a pair of complementary transistor subunits, suppresses high frequency spurious oscillations and itself forms a PNP transistor complementary to an NPN transistor; both transistors form the input stage connected to the differential amplifier, to supply a symmetrical load to the differential amplifier.

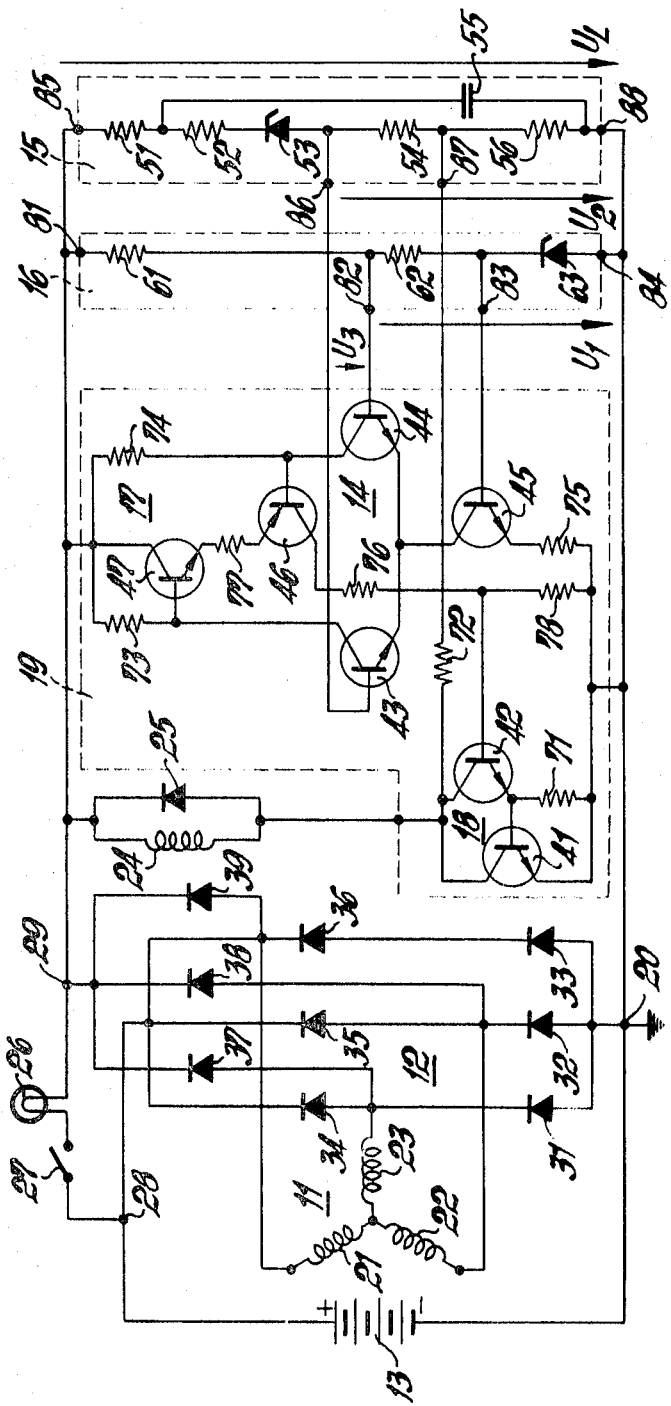

VOLTAGE REGULATOR, PARTICULARLY FOR CONSTRUCTION AS AN INTEGRATED CIRCUIT

The present invention relates to a voltage regulator and particularly to a voltage regulator for an automotive-type alternator having a rotating, excited field, the current through the field being controlled by a semiconductor switch, such as a switching transistor.

Voltage regulators of this type have been proposed, in which the output voltage of the generator is connected to a voltage divider, to which an amplifier is connected which controls the switching transistor. The present invention is particularly directed to a structure of such am amplifier especially suitable for manufacture as an integrated circuit preferable a monolithic integrated circuit.

Transistorized voltage regulators maintain the output voltage of the alternator at a predetermined average value. Regulator action occurs in cycles, responding to small variation from the predetermined value in an increasing or decreasing direction, the regulator interrupting current supply to the field winding of the alternator when the voltage exceeds the level preset for the regulator, and again connecting current from the alternator through the field winding when the voltage drops. The electrical network of the regulator also includes the field winding of the alternator. This field has a substantial inductivity and forms, together with the internal inherent winding capacity as well as lead and other capacities within the regulator an oscillatory circuit. During the regulator action, which recurs in cycles, spurious oscillations may result, which may be of wide swing and high amplitude, which amplitudes may be sufficiently great to destroy the semiconductor switching elements of the regulator.

It is an object of the present invention to so construct a voltage regulator that wide spurious voltage swings are suppressed while at the same time the advantages of monolithic integrated circuitry can be realized.

SUBJECT MATTER OF THE PRESENT INVENTION

Briefly, the amplifier of the transistorized voltage regulator is formed as a differential amplifier connected to a voltage divider. Preferably, the differential amplifier is symmetrically loaded so as to fully realize the sensitivity of this device. Thus, in accordance with a feature of the present invention, the differential amplifier is connected to an intermediate amplifier having a pair of inputs separately coupled to the outputs of the differential amplifier. Undesired spurious oscillations and voltage peaks are suppressed by including in the intermediate amplifier a transistor with low frequency cutoff.

The invention will be described by way of example with reference to the accompanying drawings, wherein:

FIG. 2 is a schematic circuit diagram of the voltage regulator;

Figure 1:
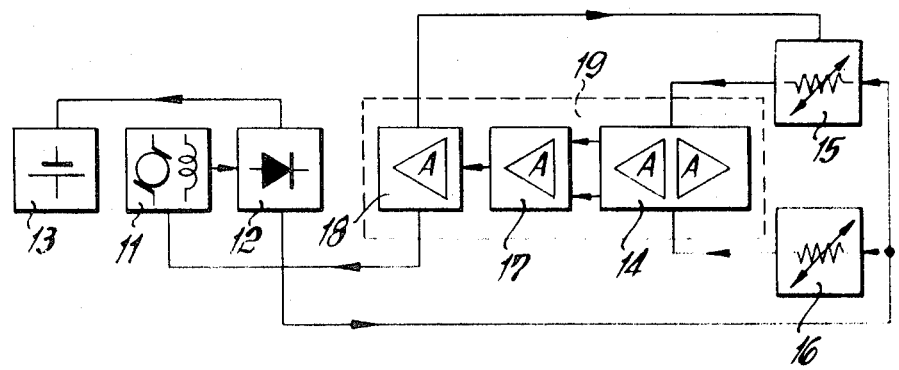
FIG. 1 is a generalized block diagram of the regulator of the present invention.

A three-phase generator 11 is connected to a bridge-type rectifier 12, which is arranged to charge a battery 13. A pair of voltage dividers, 15, 16 are connected to the bridge-type rectifier 12, the tap points of the voltage divider pair being connected to the inputs of a differential amplifier 14, having a pair of outputs. The outputs are symmetrically connected to the inputs of a preamplifier 17, which controls a power amplifier and switching network 18 which directly controls the current through the field winding of generator 11. A cross coupling, feedback line 10 from unit 18 back to one of the voltage dividers, in the example of FIG. 1 to voltage divider 15, ensures rapid and positive switching of the switching element in unit 18 from on to off state. The differential amplifier 14, preamplifier 17 and the amplifier in switching unit 18 together form an amplifier element 19.

Referring to FIG. 2: Three armature windings 21, 22, 23 of generator 11 are star-connected and supply rectifier 12 including diodes 31 to 33 and 34 to 36, to provide direct current output at a positive bus 28 and a negative, or chassis bus 20. Diode elements 31 to 36 are connected as a three-phase bridge rectifier. Battery 13 is connected between buses 20, 28.

Three additional rectifier units 37, 38, 39 are further connected to armature windings 21,22,23 to provide a second positive output bus 29. Buses 28 and 29 are interconnected by a series circuit of ignition switch 27 and a charge control lamp 26.

Generator 11 is provided with a field winding 24, to which a floating diode is connected in parallel. Field winding 24, and its diode 25 is connected to bus 29 on the one side, and to a terminal 89 of the voltage regulator on the other. The collector of an NPN switching transistor 41 is connected in series between terminal 89 and bus 20. A transistor 42, its collector likewise connected to terminal 89, has its emitter connected to the base of transistor 41 and over a resistance 71 likewise to chassis at 20. The transistor 42, likewise an NPN transistor acts as a driver for transistor 41. Its base is connected over resistance 78 to chassis bus 20. Additionally, the base of transistor 42 is connected over a resistance 76 to the collector of a PNP transistor 46, the emitter of which is connected over resistance 77 to the emitter of an NPN transistor 47 of the preamplifier. The collector of NPN transistor 47 is connected to positive bus 29. The base of transistor 46 is connected on the one hand over a resistance 74 to the positive bus 29 and on the other to the collector of a transistor 44, which forms an input part of the differential amplifier. The base of NPN transistor 47 is also connected over a resistance 73 to the bus 29 and further to the collector of a second NPN transistor 43 forming another input part of the differential amplifier. The two emitters of the transistors 43, 44 are interconnected and are directly supplied by the collector of an NPN transistor 45, serving as a constant current source. The emitter of transistor 45 is connected over resistance 75 to negative bus 20.

A pair of voltage dividers, forming a bridge network, are connected between buses 29 and 20 at terminals 81, 84 and 85, 88, respectively. Terminal 84 of voltage divider 16 is connected to the anode of a reference Zener diode 63, the cathode of which connects to a junction 83, which is connected to the base of the transistor 45, which is a constant current source. Junction 83 is connected over a resistance 62 to a cross connection or tap point junction 82 of the voltage divider; junction 82 is connected to the base of transistor 44 of the differential amplifier. A resistance 61 connects between junction 82 and junction 81, connected to the bus 29.

The second voltage divider 15 has its connection point 85 connected to positive bus 29. A filter resistance 51 is connected at junction point 85, the other end of which connects with a filter condenser 55 connected at junction 88 and to chassis bus 20. Resistance 51 is further connected to a resistance 52, the other terminal of which connects a cathode of reference Zener diode 53. The anode of reference diode 53 is connected over a tap point forming a cross connection illustrated at junction 86 with the base of transistor 43 of the differential amplifier. Additionally, it connects with a resistance 54. The other end of resistance 54 connects a junction point 87 and over a resistance 56 back to terminal 88 connected to chassis bus 20. A feedback resistance 72 interconnects between junction 87 of the voltage divider 15 and terminal 89 of the voltage regulator network.

Figure 3:
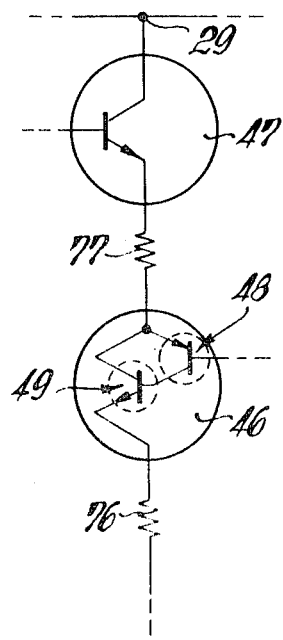
FIG. 3 is a partial circuit illustrating a transistor combination of the intermediate amplifier.

FIG. 3 illustrates a detail of a particularly advantageous structure for PNP transistor 46 of FIG. 2. Transistor 46 comprises a pair of internal, complementary transistor elements 48, 49, located adjacent each other in such a manner that the emitter connection of transistor 46 is connected to the emitter of transistor subelement 48 and additionally to the collector of transistor subelement 49, which is complementary to transistor element 48. The collector of transistor element 48 is connected to the base of the complementary transistor element 49. The base of transistor element 48 forms the base of the transistor combination 46. The collector of the transistor 46 is formed by the emitter of the transistor element 49.

With current technology for monolithic integrated circuits it is difficult to manufacture a complementary pair of transistors 46, 47, the single transistors of which have approximately equal current amplification. The particular structure of PNP transistor 46 is so arranged that the PNP transistor element 48 has low current amplification, whereas the NPN transistor unit 49 has a high current amplification. A transistor unit pair 48, 49, constructed side by side, has the input characteristics of a PNP transistor but has a low transit frequency, that is, is not capable of amplification at high frequencies. This, usually undesirable characteristic is used to advantage in the present invention. The transit frequency of such a combined unit which is substantially below the normal operating frequencies of silicon NPN transistors of current manufacture can thus inherently suppress spurious oscillations, upon suitable dimensioning of the two transistor subunits. The other characteristics of the voltage regulator are retained, the low transit frequency of transistor 46 built up of the transistor subunits not affecting regulating action. Thus, the single two-transistor unit arrangement of transistor 46 can limit the operating frequency of the voltage regulator to operate within the range for which it is designed, regardless of oscillations which might otherwise arise due to inherent inductance or capacity of connected circuit elements, that is the field winding of the alternator and other circuit components.

Figure 4:
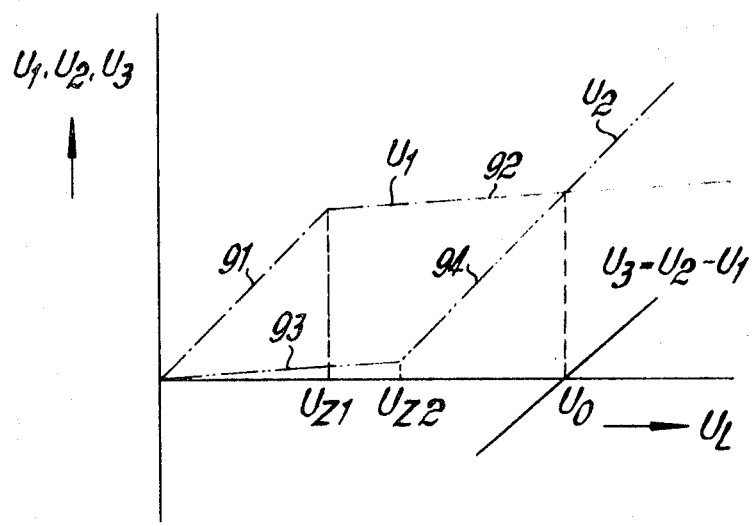
FIG. 4 is a diagram illustrating potential distribution occurring during operation of the regulator.

The voltages at the junction points 86 and 82 of the voltage dividers 15, 16 are illustrated in FIG. 4. Graph $U_1$ schematically and approximately illustrates the potential distribution at point 82 in dependence on the value of the voltage $U_L$ occurring between buses 29 and 20; graph $U_2$ illustrates the voltage, approximately and in schematic form, at point 86 (with respect to bus 20). Graph $U_3$ illustrates the difference between the voltages $U_2$ and $U_1$.

As the voltage $U_L$ increases from a value of zero, voltage $U_1$ at point 82 of voltage divider 16 increases similarly, as illustrated by the portion of the graph 91 (currents flowing from junctions 82 and 83 of the voltage divider 16 are here neglected). Voltage $U_1$ increases until the breakdown value $U_{Z1}$ of reference diode 63 is reached. AS $U_L$ increases, the value of $U_1$, as illustrated by the portion of graph at 92 remains essentially constant. The voltage distribution at junction 86 of voltage divider 16 has a different characteristic. At low values of $U_L$, reference diode 53 is blocked, so that voltage $U_2$ essentially has the value of zero. The voltage $U_2$, the, as illustrated in portion of the graph 93, is almost horizontal. When $U_L$ reaches the breakdown potential $U_{Z2}$ of reference diode 53, voltage $U_2$ increases, as illustrated in the portion of the graph at 94, essentially directly in proportion (with a factor of one) with the voltage $U_L$. The portions of the graphs 92 and 94 will include the angle $\alpha$.

The operation of the regulator in accordance with FIG. 2 can be best explained in connection with its action on the generator 11.

The rotating field of generator 11 is coupled with an internal combustion engine, for example an automotive vehicle engine not shown. Upon starting of the engine, ignition switch 27 is closed. At low speed of the engine, armature windings 21, 22, 23 generate hardly any voltage so that current will flow from the positive terminal of battery 13 over the ignition switch and the ignition control lamp 26 (which will light) through field windings 24 and transistor 21 which is conductive, and back to the chassis bus 20 and to the battery. Field current within field winding 24, and rotation of the alternator will create a potential which is rectified in rectifier unit 12, so that the voltage between lines 28 and 20, and between 29 and 20 will rapidly increase. When the alternator has reached sufficient speed, rectifiers 37, 38, 39 will, themselves, supply sufficient filed current so that the charge control lamp 26 will extinguish. Battery 13 will be charged over rectifier units 31 to 36, and additional loads can be supplied from the generator.

The self-excitation causes further increase in the voltage of the generator. When a certain predetermined maximum value is reached, amplifier 19 will cause turnoff of driver transistor 42 and control transistor 41. Field current can no longer flow to the chassis bus 20 of the generator, and will continue, due to the inductivity of the field winding, to flow over floating diode 25. Due to the inherent resistance of field winding 24, the current through winding 24 and diode 25 will decrease, however, causing a lower voltage to be generated in the armature windings 21, 22, 23 and the charging voltage will decrease. When a certain minimum value is reached, transistor 41 will again become conductive, current will again flow through field winding 24 and the output voltage of the generator $U_L$ will again increase. This cycle will continuously repeat at a frequency of from between 50 to 200 Hz.

Control of the conduction of transistor 41 is obtained by the amplifier and control circuit of the voltage regulator. The voltage divider pair 15, 16, has a pair of nonlinear elements, namely reference diodes 53, 63. Voltage $U_1$ between junctions 82 and 84 of branch 16 is, as clearly seen in FIG. 4, a nonlinear function of the output voltage $U_L$ appearing between points 81 and 84; voltage $U_2$ of the voltage divider branch 15 is a nonlinear function of the same output voltage $U_L$, which is also connected to points 85, 88.

Let it be assumed that initially the voltage $U_L$, to be regulated, is too low. Reference diode 53 in branch 15 is nonconductive and the voltage at point 86 (corresponding to the portion of the graph illustrated at 93 in Fig. 4) is almost zero. Transistor 43 in differential amplifier 17 is blocked. The voltage at point 82 of the voltage divider branch 16 is, however, essentially the same as the value at junction 81, since reference diode 63 is likewise nonconductive. Differential amplifier transistor 44 is therefore conductive. Current will flow over resistance 74 and the voltage across resistance 74 will cause the two transistors 46 and 47 to become conductive, since the base of transistor 47 is connected over resistance 73 essentially to the voltage of line 29. Current will flow through resistances 76 and 78. The voltage across resistance 78 will cause driver transistor 42, and it in turn switching transistor 41 to be conductive.

When transistor 41 becomes conductive, excitation current will flow through the field winding and output potential $U_L$ will increase. As soon as the output voltage $U_L$ reaches the value $U_{Z1}$, the voltage at junction 83 will remain constant and the source of continuous, constant current that is transistor 45, will be in normal operating condition. The voltage at junction 86 will continue to remain almost zero. Transistor 43 will remain blocked, as before, and current will flow through the transistor states 46, 47, which retains transistor switch 41 in the ON condition. When the voltage $U_L$, however, exceeds the value $U_{Z2}$, voltage at junction 86 will increase in accordance with the portion of the graph 94, FIG. 4. Voltage $U_2$ will be small in relation to the voltage $U_1$, the difference voltage $U_3$ will be highly negative and semiconductor switch 41, 42 will continue conductive. Due to the voltage drop across resistance 62, voltage $U_1$, however, increases slightly.

As soon as output voltage $U_L$ has reached the value $U_0$ (FIG. 4), the two voltages $U_1$ and $U_2$ will be equal. Difference voltage $U_3$ will be zero. Both differential amplifier input transistors 43 and 44 will be conductive. The bases of the preamplifier transistors 46, 47 will have the same potential since their emitters are interconnected.

Both are therefore nonconductive. No base current will flow through resistance 76 in diver transistor 42 and switching transistor 41 will be nonconductive, disconnecting excitation current. In actual operation, the turnoff will be initiated just in advance of output voltage $U_L$ reaching the value $U_0$, since the preamplifier transistors 46, 47 as well as all other transistors require a certain minimum base-emitter voltage in order to carry collector current.

Feedback resistance 72, was, in effect, parallel to the resistance 56 which forms a portion of the voltage divider 15 during such time as semiconductor switch 41, 42 was conductive. One end of resistance 72, in effect, was at zero potential. As soon as the semiconductor switch becomes nonconductive, however, the end of resistance 72 is, in effect, connected over the diode 25 and field winding 24 to the voltage $U_L$ which is to be regulated. The voltage at junction point 87, and with it the voltage $U_2$ is further increased over the feedback resistance 72 when the switching-off condition occurs. This cross coupling resistance thus substantially increases the switching speed. Resistance 72 could also be connected to junction 86 and thus directly to an input of the difference amplifier. It is, however, usually preferred to connect the resistance 72 to a tap point between junctions 86 and 88, as shown, that is to form a tap between resistances 54, 56 of voltage divider 15.

As soon as semiconductor switch 41, 42 becomes nonconductive, the excitation current will decrease as above described. Output voltage $U_L$ will drop until the value of voltage $U_2$ will be so much below the value of voltage $U_1$ that the differential amplifier transistor 43 does not receive sufficient collector current in order to hold differential amplifier transistors 46, 47 in blocked condition. Current through resistance 76 connected to the base of driver transistor 72 will thus cause closing of semiconductor switch 41, that is conduction of the transistor 41, and current can again flow from the main supply through the field winding 24. Feedback resistance 72, also in the switching on mode, increases the switchover speed. As soon as transistors 41, 42 become conductive, resistance 72 is placed, in effect, at the left side (FIG. 2) from the positive bus 29 to the negative bus 20, which assists in the decrease of the voltage $U_2$, and thus the increase in the base current of the driver transistor 42. Voltage $U_L$, as soon as field current flows, will again increase and the regulator cycle will continue.

Field winding 24 has a substantial number of turns so that the entire field will have a certain and quite measurable inductive reactance. Additionally, the various turns on the field windings, with respect to each other, will have a certain capacity which may rise to a substantial, measurable value when distributed over the entire field 24. The connections from the field 24 to junction 89 of amplifier 19 will also have capacity. All capacities within the circuit, and additional stray capacities may form, together with the inductivity of field winding 24 circuit which is subject to spurious oscillations.

The voltage regulator, in its regulating action, is an On-Off regulating circuit having an operating frequency which may vary between 20 and 500 Hz., although the range may be less. The regulator has a plurality of transistor stages, each having a high degree of amplification, so that spurious oscillations may occur in the entire regulating network, and particularly in the time in which the semiconductor switch 41, 42 changes between conductive and nonconductive states. The frequency is determined by the inductive and capacitative reactance, as described, formed by the inductivity of the field together with the network and inherent capacities. It has been found that, in actual operation, the values of inductive and capacitative reactance may be so distributed that the frequency of the possible oscillations is high with respect to the normal operating cycling frequency.

According to a feature of the invention, such spurious oscillations are suppressed by using a semiconductor amplifier 46 which is so arranged that it is strongly frequency dependent, and particularly so constructed that its amplification factor drops sharply at higher frequencies.

Particularly desirable arrangements can be obtained by utilizing the present invention, considering the following basic facts: It is important to symmetrically load the input of the differential amplifier that is transistors 43, 44 so that no distortion of the input output transfer characteristic will result. If the input of semiconductor switch 41, 42 were directly connected to the outputs of the transistors 43, 44, unsymmetrical loading may result. The additional amplifier stage using transistors 46, 47, is therefore so arranged that the inputs to the transistors 46, 47 are symmetrically coupled to the two outputs of the transistors 43, 44. The transistors 46, 47 thus has a push-pull input controlled by the output of transistors 43, 44 and a single ended output. The second amplifier stage transistors 46, 47 is preferably formed of a pair of complementary transistors which provides for a particularly simple network while retaining the advantages of symmetrically input of the differential amplifier. The input resistances and the amplification of the differential amplifier can be high, so that only small base and collector currents are necessary. The base of transistor 45 will receive a fixed potential from reference diode 63, which acts as a constant current source.

Resistance 77 interconnecting the emitters of the complementary transistors 46, 47 is a feedback resistance which increases the stability of the entire voltage regulator. It however, also influences the hysteresis, that is the lag between switchover of the transistors 41, 42 upon change from conduction to nonconduction. It is not strictly necessary. Resistance 76 limits the base current of driver transistor 45 to a permissible value. Resistances 76, 77 may be part of an integrated circuit and can preferably be formed as a connecting resistance with the associated transistors 46, 47. Resistance 78 is used to bring the base of driver transistor 42 to zero potential, when the driver transistor is nonconductive as well known.

The voltage regulator of the present invention has the advantage that the values of the collector-emitter quiescent potentials of the two preamplifier transistors 46 and 47, which carry the base current for driver transistor 42, do not have an undesirable influence on the performance of the regulator network, so that, which is particularly important in integrated circuits, only a small number of network elements need be used.

The control network has a high amplification, due to the use of the two-stage differential amplifier. The gain is so high that the variation of the output voltage $U_L$ which causes turnon and turnoff of the control transistor 41, from a nominal value, can be very small. The voltage regulator thus will completely control the output voltage within a very small tolerance limit, since only minor changes of the difference voltage $U_3$ will cause switch-over. As is well known, differential amplifiers such as the circuit including transistors 43, 44 are almost independent, within a wide value, of the absolute value of the voltages $U_1$ and $U_2$, and AND responsive only to the difference between the voltages $U_1$ and $U_2$ (that is to $U_3$). As a result, the temperature dependence on control action is determined almost entirely by the characteristics of the voltage divider pair 15, 16. This voltage divider pairs, in view of this lack of sensitivity of the difference amplifier to absolute voltages, can be constructed in a simple manner. The filtering network formed of resistance 51 and condenser 55, connected in the voltage divider branch 15 acts to dampen voltage peaks which occur during the control cycles and which, due to the nonlinear characteristic of reference diode 53, would otherwise be transferred to the output voltage. No such filtering network is necessary in the other voltage divider branch 16, since reference diode 63 essentially suppresses any voltage peaks. Thus, only a single condenser is necessary. Zener diode 63 in branch 16 thus has a dual function: for one, it provides the reference voltage for the base of the constant current source including transistor 45, and additionally, together with resistance 62, it forms the reference source for the base of differential amplifier transistor 44. Resistance 62 bridges the potential difference caused by the base-collector voltage of transistor 45 and the base-emitter voltage of transistor 44.

Differential amplifier 43, 44 46, 47 and the constant current source including transistor 45, and the voltage divider 15, 16 may be used to control also PNP semiconductor switches. The control of a PNP output transistor can be taken off at the collector of transistor 47.

The present invention thus provides a voltage regulator which is particularly suitable to be built as monolithic integrated circuit . Voltage divider branches 15, 16 can be constructed of simple network elements while being substantially immune to variation in temperature and output voltage. The particular form of amplifier 19 prevents damage to the voltage regulator due to overvoltages at the buses 20. 29 or due to excess voltage peaks as a result of spurious oscillations. The voltage regulator can be constructed with only a small number of standard electrical circuit elements, as well as in the form of monolithic integrated circuits.

I Claim:

1. A voltage regulator for a generator having a field winding and direct current output terminals connected to said generator;
   a voltage divider circuit adapted for connection to, and sensing the output voltage of the generator;
   a controllable semiconductor switching element adapted for connection to control the current through said field winding and being controlled in dependence on sensed output voltage appearing across said voltage divider;
   a differential amplifier circuit having its input connected to said voltage divider, said differential amplifier comprising
   a two-stage amplifier having a pair of input transistors and a push-pull connected pair of output transistors, one each of the input transistors being connected to an input of the differential amplifier and having its output, each, connected to a respective input of a respective push-pull output transistor;
   the push-pull output transistor being connected to provide a single ended output to said semiconductor switching element, the outputs of said input transistors being symmetrically connected to the inputs of said push-pull transistors, to provide for balanced loading of the inputs to said differential amplifier on said voltage divider circuit.

2. Regulator according to claim 1, wherein the push-pull connected transistors form the second stage of said differential amplifier;
   and one transistor (46) has low-frequency cutoff characteristics, whereby high frequency oscillations due to inherent reactances in the generator and the voltage regulator, connected thereto, are not amplified but suppressed.

3. Regulator according to claim 2 wherein said transistor with low-frequency amplification characteristics comprises a pair of complementary transistor elements (FIG. 2), the emitter of said transistor being formed by the emitter connection of one transistor element and the collector of a complementary transistor element; the collector of said transistor being formed by the emitter of said complementary element; and base of said complementary transistor element and the collector being interconnected; the base of said transistor being formed by the base of said transistor element.

4. Regulator according to claim 3 wherein said push-pull amplifier stage comprises a pair of complementary transistor units (46, 47) having a symmetrical input and a single-ended output.

5. Regulator according to claim 1 wherein the second stage of said differential amplifier comprises a pair of complementary transistors (46, 47) and resistance components (76, 77, 78); the first stage of said differential amplifier comprises a pair of transistors (43, 44) and resistance elements (73, 74);
   and a constant current source is provided supplying said transistors of the differential amplifier and providing a sensing potential therefore and including a transistor (45) and at least one resistance element;
   said transistors and said resistance elements being formed as a single monolithic integrated circuit.

6. Regulator according to claim 5, wherein at least one of said push-pull transistors has a low-frequency cutoff characteristic to suppress spurious oscillations.